United States Patent [19]
Lawandy et al.

[11] Patent Number: 5,908,608
[45] Date of Patent: Jun. 1, 1999

[54] SYNTHESIS OF METAL CHALCOGENIDE QUANTUM

[75] Inventors: Nabil M. Lawandy, North Kingstown, R.I.; Charles M. Zepp, Hardwick; Richard F. Rossi, Norton, both of Mass.

[73] Assignee: Spectra Science Corporation, Providence, R.I.

[21] Appl. No.: 08/910,160

[22] Filed: Aug. 12, 1997

Related U.S. Application Data

[60] Provisional application No. 60/029,422, Nov. 8, 1996.

[51] Int. Cl.$^6$ ............................ C01B 17/20; C01B 19/04; C01G 9/00
[52] U.S. Cl. ................. 423/509; 423/561.1; 423/566.1; 423/104
[58] Field of Search ................................ 423/509, 508, 423/511, 561.1, 566.1, 104; 252/519.4, 519.51

[56] References Cited

U.S. PATENT DOCUMENTS 3,714,339  1/1973  Vecht ........................ 423/509

FOREIGN PATENT DOCUMENTS 54-115698  9/1979  Japan .

OTHER PUBLICATIONS

Low et al. "The Fabrication of Light–Emitting Devices from Hot–Pressed ZnSe Powders" J. of Material Science, vol. 13 No. 1 pp. 72–76, Jan. 1978.

Grant and Haekh's "Chemical Dictionary" Edited by Grant et al. 5th Edition, McGraw–Hill Book Co. USA, pp. 114–115, No Month 1987.

"Synthesis and Characterization of II–VI Semiconductor Nanocrystallites", Murray et al., JACS, vol. 115, pp. 8706–8715 (1993) No Month, No. 19.

"Synthesis and Stuctural Characterization of IIVoI Semiconductor Nanocrystallites", by Murray et al., Supplement ot Z. Physics. D 26, pp. 231–233 (1993) No Month.

*Primary Examiner*—Gary P. Straub
*Assistant Examiner*—Timothy C Vanoy
*Attorney, Agent, or Firm*—Perman & Green, LLP

[57] ABSTRACT

An aqueous system for the production of metal chalcogenide nanocrystalline salts such as zinc selenide, from a hydrolyzable chalcogen carbonyl compound, such as selenourea, by simple hydrolysis thereof under alkaline conditions in the presence of water soluble metal hydroxide, such as zinc hydroxide in the form of the zincate ion, i.e., $Zn(OH)_4^{-2}$. Selenourea contains selenium in the correct oxidation state, is inexpensive, commercially-available and readily hydrolyzable under aqueous basic conditions in the presence of the zincate ion to form zinc selenide. The zinc selenide is insoluble in the alkaline aqueous vehicle and precipitates over time in the form of nanocrystallites or quantum dots of the zinc selenide.

5 Claims, No Drawings

SYNTHESIS OF METAL CHALCOGENIDE QUANTUM

The present application is related to co-pending Provisional patent application Ser. No. 60/029,422 of Nabil M. Lawandy et al., filed Nov. 8, 1996 titled "Synthesis of Metal Chalcogenide Quantum Dots from Aqueous Media", based on which priority is herewith claimed under 35 USC 119(e) and the disclosure of which is incorporated herein by reference in its entirety.

BACKGROUND OF THE INVENTION

1. Field of the Invention

The present invention relates to nanometer-sized crystallites or quantum dots having semiconductor properties, and more particularly to an improved process for synthesizing such crystallites from readily available, inexpensive starting materials and under mild reaction conditions.

2. State of the Art

The synthesis of metal chalcogenide quantum dots, such as of zinc selenide, is known but the existing methods are unsatisfactory and not amenable to scale-up. For example, Murray et al disclose a method for the synthesis of cadmium selenide quantum dots in the Journal of the American Chemical Society, Vol. 115, pages 8706–8715 (1993). This method makes use of tri-n-octylphosphine as a coordinating solvent, either elemental selenium or bis(trimethylsilyl) selenium as the chalcogenide donor, and dimethylcadmium as the metal donor. The disadvantage to this method is the nature of the reactants, most of which need to be synthesized, and the use of an expensive, air sensitive, unstable, solvent as well as the need for high reaction temperatures. This method is considered to be unsatisfactory for the production zinc selenide.

There exists a need for a process for producing metal chalcogenide nanocrystals or quantum dots from readily available, stable reactants and mild reaction conditions which process can be carried out on a relatively large scale economically and efficiently.

SUMMARY OF THE INVENTION

The present invention relates to the discovery of an aqueous system for the production of metal chalcogenide nanocrystalline salts such as zinc selenide, from a hydrolyzable chalcogen carbonyl compound, such as selenourea, by simple hydrolysis thereof under alkaline conditions in the presence of a metal hydroxide, such as zinc hydroxide in the water-soluble form of the zincate ion, i.e., $Zn(OH)_4^{-2}$.

Selenourea is commercially-available and readily hydrolyzable under aqueous basic conditions in the presence of the zincate ion to form zinc selenide. The zinc selenide is insoluble in the alkaline aqueous vehicle and precipitates over time in the form of nanocrystallites or quantum dots of the zinc selenide.

The essential advantages of the present process, with respect to the production of zinc selenide, are the commercial availability and stability of the reactants, namely the seleno carbonyl compounds, preferably selenourea, and the alkaline-water-soluble form of zinc hydroxide, namely the zincate ion, and their ability to react at low or room temperatures to form the metal chalcogenide salt, namely zinc selenide, which crystallizes out of the aqueous alkaline reaction medium in the form of nanocrystallites or quantum dots.

The chalcogen carbonyl reactant, preferably selenourea, contains selenium in the correct oxidation state for the production of quantum dots, and is capable of undergoing hydrolysis under aqueous conditions, as illustrated:

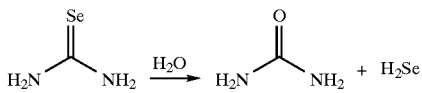

Other selenium compounds such as hydrogen selenide and sodium selenide are not readily commercially available due to their inherent instability in air.

The available, stable seleno carbonyl compounds are easily hydrolyzable in both acidic and alkaline aqueous media but the present aqueous reaction medium must be alkaline in order to solubilize the zincate ion and to precipitate the formed zinc selenide, which is soluble in acidic aqueous media. The balanced equation for the formation of zinc selenide from selenourea and zincate is illustrated:

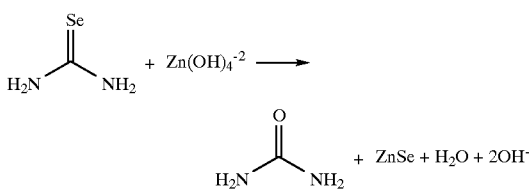

The following example is given to illustrated preferred procedures for producing zinc selenide quantum dots according to the present invention.

The reactants are produced in the following manner, using deionized water through which nitrogen gas has been bubbled for 15 minutes and which is thereafter degassed under vacuum.

A sodium hydroxide solution is prepared by making 100 ml of 0.2M NaOH in the degassed water, placing a septum thereover, and bubbling nitrogen gas therethrough.

A zinc chloride solution is prepared by making 100 ml of 0.1M $ZnCl_2$ in the degassed water, placing a septum thereover, and bubbling nitrogen gas therethrough.

A seleno-urea solution is prepared by placing 1 gram of seleno-urea in a flask and adding 84 ml of water and a stir bar. Immediately place a septum on the flask and bubble nitrogen into the flask, with stirring, until the seleno-urea is in solution. It will form a pale orange solution.

The reaction is carried out by adding 2 ml of the 0.2M NaOH to a 15 ml glass tube containing 6 ml of the water. Then add 1 ml of the 0.1M $ZnCl_2$ solution, at which time a white floc may form. Next a septum is placed on the glass tube and nitrogen is bubbled in, after which 1 ml of the seleno-urea solution is added.

The quantum dots of zinc selenide can be formed in the glass tube by carrying out any of the following procedures:

(a) The glass tube may be stoppered, and placed in a 65° C. bath for 10 minutes. A pale orange precipitate will appear which, after centrifuging and decanting of the supernatant, provides an aqueous suspension containing quantum dots of zinc selenide.

(b) The glass tube may be treated as above to form the pale orange precipitate. However, the glass tube is allowed to set for one week before it is centrifuged, the supernatant is decanted and the aqueous suspension is analyzed for quantum dots of the zinc selenide.

(c) The glass tube may be treated as in procedure (b) above except that it is not placed in a 65° C. bath. The stoppered tube remains at room temperature. This procedure is most preferred.

It will be apparent to those skilled in the art, in the light of the present disclosure, that the present aqueous process is also useful for the formation of other metal chalcogenide salts from hydrolyzable chalcogen carbonyl compounds, i.e., carbonyl compounds of sulfur, selenium or tellurium in the presence of the desired metal ions and at the appropriate pH for the dissolution of the reactants and for the precipitation of the formed metal chalcogenide salt.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A process for the preparation of zinc chalcogenide nanocrystalline salts selected from the group consisting of zinc selenide, zinc sulfide and zinc telluride in an aqueous alkaline reaction medium comprising hydrolyzing a chalcogen carbonyl compound wherein the chalcogen is selenium, sulfur or tellurium in the presence of water-soluble zincate ions $Zn(OH)_4^{-2}$ to form and crystallize (the metal) zinc chalcogenide nanocrystalline salt; centrifuging the reaction medium to separate said zinc selenide, zinc sulfide or zinc telluride, and decanting the supernatant from the zinc chalcogenide nanocrystalline salt.

2. The process according to claim 1 in which the metal chalcogenide salt is zinc selenide.

3. The process according to claim 1 in which the chalcogen carbonyl compound comprises a seleno carbonyl compound.

4. The process according to claim 3 in which the seleno carbonyl compound comprises selenourea.

5. The process according to claim 1 in which the aqueous alkaline reaction medium resulted from the reaction between sodium hydroxide and zinc chloride which formed $Zn(OH)_4^{-2}$.

* * * * *